United States Patent
Stouffer

(10) Patent No.: US 10,576,466 B2
(45) Date of Patent: Mar. 3, 2020

(54) COMPOSITE ION EXCHANGE MEDIA FOR LIQUID FILTRATION SYSTEMS

(71) Applicant: 3M INNOVATIVE PROPERTIES COMPANY, St. Paul, MN (US)

(72) Inventor: Mark R. Stouffer, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 605 days.

(21) Appl. No.: 14/387,601

(22) PCT Filed: Mar. 7, 2013

(86) PCT No.: PCT/US2013/029502
§ 371 (c)(1),
(2) Date: Sep. 24, 2014

(87) PCT Pub. No.: WO2013/151654
PCT Pub. Date: Oct. 10, 2013

(65) Prior Publication Data
US 2015/0083667 A1    Mar. 26, 2015

Related U.S. Application Data

(60) Provisional application No. 61/620,618, filed on Apr. 5, 2012.

(51) Int. Cl.
*C02F 1/28* (2006.01)
*C02F 1/42* (2006.01)
(Continued)

(52) U.S. Cl.
CPC ............ *B01J 39/20* (2013.01); *B01D 15/361* (2013.01); *B01J 20/20* (2013.01);
(Continued)

(58) Field of Classification Search
CPC ...... C02F 1/42; C02F 1/283; C02F 2001/422; C02F 2001/425; C02F 2001/427;
(Continued)

(56) References Cited

U.S. PATENT DOCUMENTS 2,636,851 A * 4/1953 McRae ................... B01J 47/08
204/252
5,147,722 A   9/1992 Koslow
(Continued)

FOREIGN PATENT DOCUMENTS

EP    1 437 376        7/2004
JP    59173183 A  * 10/1984
(Continued)

OTHER PUBLICATIONS

Martinson, Proc. Second Kodak Semin. Micro Miniaturization, Kodak Publication P-89, (1966), p. 31.

*Primary Examiner* — Matthew O Savage
(74) *Attorney, Agent, or Firm* — Scott A. Baum

(57) ABSTRACT

Provided are filtration media and matrixes comprising a pulverized powder of ion exchange resin and a polymeric binder. The resin can be pulverized to an average particle size in the range of 50 to 250 microns and can comprise a cation exchange resin, an anion exchange resin, a chelating resin, a biologically-related ion exchange resin, or combinations thereof. The media can further comprise activated carbon. The binder can be ultra high molecular weight polyethylene. The filtration media can be used to make matrixes and systems. Methods of making and using the same are also provided.

11 Claims, 1 Drawing Sheet

(51) Int. Cl.
  *B01J 39/20* (2006.01)
  *B01D 15/36* (2006.01)
  *C02F 1/00* (2006.01)
  *B01J 20/20* (2006.01)
  *B01J 20/30* (2006.01)
  *B01J 20/28* (2006.01)
  *B01J 39/24* (2017.01)
  *C02F 5/00* (2006.01)

(52) U.S. Cl.
  CPC ..... *B01J 20/28042* (2013.01); *B01J 20/3007* (2013.01); *B01J 20/3035* (2013.01); *B01J 39/24* (2013.01); *C02F 1/001* (2013.01); *C02F 1/42* (2013.01); *C02F 1/283* (2013.01); *C02F 5/00* (2013.01); *C02F 2001/427* (2013.01); *C02F 2303/22* (2013.01); *Y10T 29/49826* (2015.01)

(58) Field of Classification Search
  CPC ............. B01D 39/1661; B01D 39/2062; B01J 47/007; B01J 47/018
  See application file for complete search history.

(56) References Cited

U.S. PATENT DOCUMENTS

| | | | |
|---|---|---|---|
| 5,331,037 A | 7/1994 | Koslow | |
| 5,639,550 A | 6/1997 | Lisenko | |
| 5,928,588 A | 7/1999 | Chen | |
| 6,334,941 B1 * | 1/2002 | Iwamoto | B01D 61/48 |
| | | | 204/632 |
| 6,514,413 B2 | 2/2003 | Pimenov | |
| 6,710,093 B2 | 3/2004 | Yao | |
| 6,712,939 B2 | 3/2004 | Chen | |
| 7,112,272 B2 | 9/2006 | Hughes | |
| 7,112,280 B2 | 9/2006 | Hughes | |
| 7,169,304 B2 | 1/2007 | Hughes | |
| 7,374,680 B2 | 5/2008 | Hughes | |
| 7,507,338 B2 | 3/2009 | Bommi | |
| 2002/0119299 A1 | 8/2002 | Chen | |
| 2003/0029789 A1 | 2/2003 | Patil | |
| 2003/0062311 A1 * | 4/2003 | Yao | B01J 47/007 |
| | | | 210/660 |
| 2004/0168972 A1 * | 9/2004 | Hughes | B01D 39/1661 |
| | | | 210/502.1 |
| 2005/0121387 A1 | 6/2005 | Kuennen | |
| 2006/0070950 A1 | 4/2006 | Rasmussen | |
| 2006/0157876 A1 | 7/2006 | Harris | |
| 2006/0261004 A1 | 11/2006 | Lockledge | |
| 2009/0001011 A1 | 1/2009 | Knipmeyer | |
| 2010/0243572 A1 | 9/2010 | Stouffer | |
| 2011/0042298 A1 * | 2/2011 | Stouffer | B01D 39/2062 |
| | | | 210/443 |
| 2011/0305861 A1 * | 12/2011 | Nishio | B29C 47/0023 |
| | | | 428/36.9 |

FOREIGN PATENT DOCUMENTS

| | | |
|---|---|---|
| JP | 2009/209314 A | 9/2009 |
| WO | WO 94/06850 | 3/1994 |
| WO | WO 1998/36831 | 8/1998 |
| WO | WO 2004/065001 | 8/2004 |
| WO | WO 2007/0109774 | 9/2007 |
| WO | WO 2009/140033 | 11/2009 |
| WO | WO 2012/122022 | 9/2012 |

* cited by examiner

COMPOSITE ION EXCHANGE MEDIA FOR LIQUID FILTRATION SYSTEMS

TECHNICAL FIELD

The present disclosure relates to liquid filtration systems and filter matrixes and media, wherein the filter media contains, for example, ion exchange media in particle form, such as a pulverized powder of resin.

BACKGROUND

Numerous types of water filtration systems are commercially available. Traditionally, beds of loose carbon particles were used for removing metals and/or organic materials from water. Composite blocks can be made from combinations of sorptive materials, such as adsorbent activated carbon, and polymeric binders, such as ultra high molecular weight polyethylene (UHMW PE), that have been sintered together under conditions of heat and pressure and are useful in water filter technology. Carbon block technology, for example, provides comparable functionality to loose bed carbon particles without the particle shedding or taking up too much space. With carbon block technology, pressure drop across the block can increase as a result of increasing quantities of adsorptive materials. Moreover, exposure of carbon blocks to heat and pressure can limit the types of adsorptive materials available for use in the blocks. Historically, carbon block technology was generally precluded from using adsorptive media that is sensitive to thermal degradation, such as ion exchange resins.

Improved performance for ion exchange, however, has potential application to a wide variety of fluid purification applications. One example is a growing market for scale control systems for water used in the food and beverage industries. Current systems rely on disposable (non-regenerable) fixed beds of cation exchange resin to remove hardness. Currently, limitations include relatively short service life, relatively high pressure drop and low flow rates. Development is needed to improve kinetics and to increase treatment capacity per unit volume of media. Another application is for residential softening applications, which although typically regenerable, there is a desire to make them smaller while maintaining capacity and treatment rate. Similarly, there is also a need to improve capacity and reduce size of systems for filtration of photoresist compositions and high-purity chemicals as may be used in the electronics manufacturing industry.

Literature indicates that performance of fixed beds of cation exchange resins is often limited by film diffusion or by intraparticle diffusion. Most commercial resin particles are relatively large (0.6-0.9 mm) Although it can be expected that use of smaller particles would generally improve kinetics, the understanding has historically been that smaller particles would lead to an even higher pressure drop.

A concern with respect to immobilizing ion exchange resin is that literature and resin vendor data indicates that the media is not stable at the high temperature used for melting binders such as ultra high molecular weight polyethylene. Data provided by cation exchange resin suppliers indicate that functionality of resin can be reduced at temperatures above 120° C.

Another concern in molding ion exchange resin is that the material swells on wetting and swells on exchange (as much as 90%), which could cause serious problems with integrity of media composites or cause pressure drop problems.

There is an ongoing need to provide water filtration systems that use ion exchange resin in composite form that provides excellent ion exchange kinetics without deleterious effects on pressure drop and equilibrium capacity.

SUMMARY

Provided are filtration media and matrixes, systems that utilize the same, and methods of making and using them. In a first aspect, provided is a filtration matrix comprising a polymeric binder that immobilizes a pulverized powder of an ion exchange resin. In one embodiment, the ion exchange resin comprises a cationic resin, an anionic resin, a chelating resin, a biologically-related ion exchange resin, or combinations thereof. The pulverized powder can comprise particles having an average particle size in the range of about 50 to about 250 micron. The filtration matrix can further comprise activated carbon that is immobilized by the polymeric binder. The polymeric binder can be present in an amount in the range of 10 to 40% by weight of the media. One or more embodiments provides that the polymeric binder comprises ultra high molecular weight polyethylene. The polymeric binder can comprise particles having an irregular, convoluted surface formed from ultra high molecular weight polyethylene.

A detailed embodiment provides that the ion exchange resin is present in an amount in the range of 50 to 90% by weight and the polyethylene binder is present in an amount in the range of 10 to 40% by weight.

In one embodiment, the filtration matrix is effective to provide an increased hardness reduction as compared to a comparative bed media that comprises an ion exchange resin in bead form that is not immobilized by a binder. Another embodiment is the filtration matrix being effective to provide lower pressure drop as compared to a comparative bed media that comprises an ion exchange resin in bead form that is not immobilized by a binder.

In another aspect, a filtration system comprises: a filter matrix formed from an ultra high molecular weight polyethylene binder that immobilizes a pulverized powder of ion exchange resin, a housing surrounding the filter matrix, a fluid inlet, and a fluid outlet.

Another aspect is a method of filtering comprising contacting a fluid with the filtration matrixes disclosed herein. In one detailed embodiment, the filtration matrix in a scale reduction filter.

Also provided are methods of making a filtration system, the methods comprising: providing a pulverized powder of ion exchange resin; contacting the pulverized powder of ion exchange resin with a polymeric binder comprising ultra high molecular weight polyethylene to form a media mixture; heating the media mixture form a heat-treated matrix; compressing the media mixture to form a filtration block; inserting the filtration block in a housing to form the filtration system. In one or more embodiment, the heating step is at a temperature of about 180° C. or less. In another embodiment, the heating step is at a temperature in the range of about 145-160° C.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
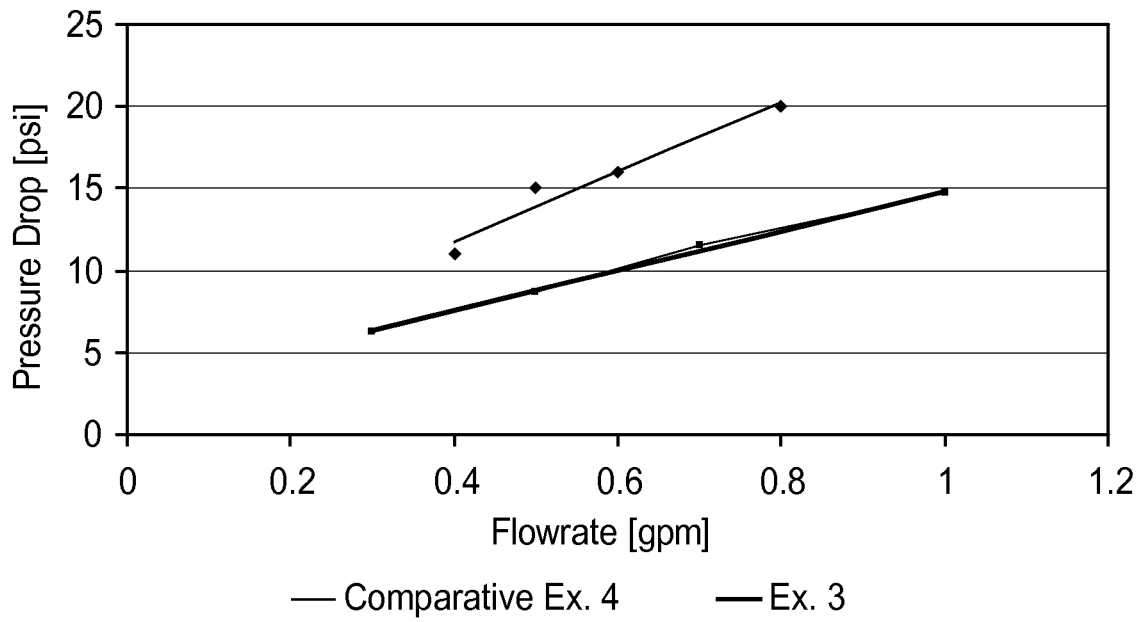
FIG. 1 is a graph of pressure drop (psi) versus flow rate (gpm) for a comparative packed bed of ion exchange beads and a filtration block made according to an embodiment.

Provided are filtration media, matrixes, and systems for liquid purification that utilize ion exchange resin in particle form, for example, pulverized powder form. The particles can have an average particle diameter of about 125 microns (or in the range of about 50 to about 250 micron, or about 75 to about 200, or about 100 to about 150). The pulverized ion exchange resin particles are mixed with a polymeric binder such as ultra high molecular weight polyethylene to form a media. The media can then be heated and compressed and formed into a matrix or filter block or element such that a binder immobilizes the pulverized powder of ion exchange resin. Sorptive agents, such as activated carbon and/or diatomaceous earth, can be included in the media or matrix. Reduction agents, such as titanium silicates or titanium oxides, can also be included in the media or matrix.

Testing has indicated that use of ion exchange resin in a composite form (radial flow monolith or block) can significantly increase kinetics of calcium and magnesium reduction compared to resins in bead form. Further, pressure drop is significantly reduced with filtration matrixes as provided herein, such as a radial flow block or composite, as compared to a comparative media, such as a bed of loose resin material in bead form, whose ion exchange resin is not immobilized by a binder. Surprisingly, the composites also exhibited higher equilibrium capacity for hardness reduction, by as much as twice, over loose beds of resin. Without intending to be bound by theory, it is thought that the use of smaller particles increased access to ion exchange sites in the interior of particles. Substantial increase in kinetics in combination with both a substantial reduction in pressure drop and an increase in equilibrium capacity represents an unexpected result.

It was also surprisingly found that resins could be immobilized with ultra high molecular weight polyethylene UHMW PE by molding in closed molds at temperatures up to 180° C., while maintaining effectiveness for cation exchange. In one or more embodiments, a temperature range of 145-160° C. is suitable.

Using a process of mold filling by impulse and compression during molding, composite blocks formed with UHMW PE binders and pulverized ion exchange resin showed high integrity with no pressure drop issues. It was found that some degree of mold compression is needed to mold blocks to achieve high integrity without excessive amounts of binder. Without intending to be bound by theory, it is thought that compression aids in forming point-to-point bonds between the pulverized resin and binder particles.

Another advantage of the media and matrixes disclosed herein is that multi-functional composite filters can be formed. For example, for hardness reduction applications where some reduction of chlorine is also required, addition of some activated carbon to the blend allows reduction of hardness and chlorine in one composite media.

Composite blocks provided herein can be used to improve hardness reduction for water in the food and beverage industry. In a particular application, it is desirable to use these composite blocks in scale reduction filters for scale control of, for example, coffee makers. Such filters can include filters in the ScaleGard® Pro series sold by 3M. In such applications there is a need for high capacity per unit volume, low pressure drop and rapid kinetics. Such composite blocks could also be applied to any ion exchange application. For example, they could be installed in residential water softening filters. In another example, the composite blocks could be suitable for heavy metals reduction (specifically, aluminum reduction) in carbon block filters. Still further applications include filtration of photoresist compositions and high-purity chemicals as may be used in the electronics manufacturing industry. Heavy metal applications that would be of interest are: lead, mercury, cadmium, copper, arsenic, and the like.

Reference to "pulverized" or "pulverized form" means that a resin bead has been mechanically ground to a size and shape smaller than its original. In one or more embodiments, the ion exchange material is powdered or a pulverized powder.

"Ion exchange resin" refers to an insoluble matrix (or support structure) normally in the form of small beads fabricated from an organic polymer substrate. The material has a structure of pores on the surface that, upon chemical activation, can comprise exchange sites that trap and release ions.

"Functionalized," as used herein to describe a characteristic of substrates, refers to a state wherein a substrate (e.g., any type of insoluble solid or porous matrix, whether in particulate form or otherwise) is configured to bind one or more contaminants. Functionalized substrates include ion exchange resins.

"Microreticular," used herein to describe ion exchange resins, refers to ion exchange resins having no permanent pore structure. For example, a microreticular may comprise a cross-linked polymer gel having polymeric chains, wherein a pore structure is defined by varying distances between the polymeric chains. Such gels, whose pore structure is subject to variation based on a number of factors, are commonly referred to as gel-type resins.

"Macroreticular," used herein to describe ion exchange resins, refers to ion exchange resins comprising one or more agglomerates of microreticulars. Openings or apertures defined between the agglomerates can give macroreticulars an additional porosity beyond that of their constituent microreticulars.

Reference to "fluid treatment unit" or "fluid filtration system" includes a system containing a filtration media and a method of separating raw fluid, such as untreated water, from treated fluid. This typically includes a filter housing for a filter element and an outlet to pass treated fluid away from the filter housing in an appropriate manner.

"Porous article" means an article having open tortuous pathways from its surface to its interior.

The term "impulse filling" or "applying impulses" means that a force is applied to the mold, causing a discrete, substantially vertical displacement that induces movement of at least a portion of the particles in the mold, causing the particles to assume a compact orientation in the mold. This includes indirect methods such as hammer blows to a table to which the molds are clamped and impacts to the table from a pneumatic cylinder, and any suitable direct methods that displace the molds with a series of jarring motions. In some embodiments, the impulse filling comprises a series of discrete displacements (i.e., impulses) applied to the mold. Impulse filling differs from vibration in that there is a period of non-movement or of little movement between the displacements. The period between displacements is typically at least 0.5 (in some embodiments, at least 1, 2, 3, 5, or even at least 10) seconds. The displacement applied to the mold has a vertical component. In some preferred embodiments, the vertical component (as opposed to the horizontal component) accounts for a majority (in some embodiments, a substantial majority (>75%), or even nearly all (>90%)) of the molds movement.

The term "UHMW PE" refers to ultra-high molecular weight polyethylene having molecular weight of, for example, at least 750,000 and is described in commonly-owned U.S. Pat. No. 7,112,280, to Hughes et al., incorporated herein by reference in its entirety.

The term "particles having an irregular, convoluted surface" refers to particles of unique morphology as set forth in U.S. Pat. No. 7,112,272 (Hughes et al.), hereby incorporated by reference in its entirety, which, when compared to particles of substantially spherical shape, show higher surface areas and lower bulk density.

Detailed embodiments provide that the polymeric binder comprises ultra high molecular weight polyethylene. Other embodiments provide that the polymeric binder further comprises particles having a generally spherical, non-porous structure. In specific embodiments, the particles having the irregular, convoluted surface have an average particle size in the range of 10 to 120 (or 20-50, or even 30-40) microns. Other specific embodiments provide that the particles having the generally spherical, non-porous structure have an average particle size in the range of 10 to 100 (or 20-80, or even 30-65) microns. Reference to "small" convoluted particles includes particles generally having 30 micron mean and 0.25 g/cc density. Reference to "large" convoluted particles includes particles generally having 120 micron mean and 0.23 g/cc. Reference to "small" spherical particles includes particles generally having 60 micron mean and 0.45 g/cc.

The term "adsorptive media" includes materials (called adsorbents) having an ability to adsorb particles via different adsorptive mechanisms. These media can be in the form of, for example, spherical pellets, rods, fibers, molded particles, or monoliths with hydrodynamic diameter between about 0.01 to 10 mm. If such media is porous, this attribute results in a higher exposed surface area and higher adsorptive capacity. The adsorbents may have combination of micropore and macropore structure enabling rapid transport of the particles and low flow resistance.

As to ion exchange resins, the filtration media or matrix may include one or more immobilized ion exchange resin(s) within the polymeric binder. Such embodiments are not limited to the use of any specific ion exchange resin or to any specific combinations of resins. Suitable functionalized particles, including ion exchange resins, for inclusion in an embodiment of the invention can be selected based, at least in part, on the requirements of an intended filtration application. Ion exchange resins suitable for inclusion in the various embodiments of the invention include cationic resin, anionic resin, mixtures of cationic and anionic resins, chelating, or biologically related ion exchange resins. The ion exchange resins can be, for example, microreticular or macroreticular. In some embodiments, the microreticular type is preferred.

Ion exchange resins that may be included in embodiments of the invention include, but are not limited to, those made of cross-linked polyvinylpyrolidone and polystyrene, and those having ion exchange functional groups such as, but not limited to, halogen ions, sulfonic acid, carboxylic acid, iminodiacetic acid, and tertiary and quaternary amines.

Suitable cation exchange resins may include sulfonated phenolformaldehyde condensates, sulfonated phenol-benzaldehyde condensates, sulfonated styrene-divinyl benzene copolymers, sulfonated methacrylic acid-divinyl benzene copolymers, and other types of sulfonic or carboxylic acid group-containing polymers. It should be noted that cation exchange resins are typically supplied with H+ counter ions, NH4+ counter ions or alkali metal, e.g., K+ and Na+ counter ions. Cation exchange resin utilized herein may possess hydrogen counter ions. An exemplary particulate cation exchange resin is MICROLITE PrCH available from PUROLITE (Bala Cynwyd, Pa.), which is a sulfonated styrenedivinyl benzene copolymer having a H+ counter ion.

Other specific examples of cationic ion exchange resins include, but are not limited to, those available under the following trade designations: AMBERJET™ I200(H); AMBERLITE® CG-50, IR-I20(plus), IR-I20 (Plus) sodium form, IRC-50, IRC-505, IRC-76, IRC-7I8, IRN-77 and IR-I20; AMBERLYST® 15, 15(wet), 15 (dry), 36(wet); and 50 DOWEX® 50WX2-100, 50WX2-200, 50WX2-400, 50WX4-50, 50WX4-100, 50WX4-200, 50WX4-200R, 50WX4-400, HCR-W2, 50WX8-100, 50WX8200, 50WX8-400, 650C, MARATHON® C, DR-2030, HCR-S, MSC-1, 88, CCR-3, MR3, MR-3C, and RETARDION®; PUROFINE PFC100H, PUROLITE NRW100, NRW1000, NRW1100, C100, C145 and MICROLITE PrCH.

Suitable anion exchange resins may include those resins having a hydroxide counter ion whereby hydroxide is introduced during the exchange process. In some embodiments, anion exchange resin comprise quaternary ammomium hydroxide exchange groups chemically bound thereto, e.g., styrene-divinyl benzene copolymers substituted with tetramethylammoniumhydroxide. In one embodiment, the anion exchange resin comprises crosslinked polystyrene substituted with quaternary ammonium hydroxide such as the ion exchange resins sold under the trade names AMBERLYST® A-26-0H by ROHM AND HAAS Company and DOW G51-0H by DOW CHEMICAL COMPANY.

Other specific examples of anionic ion exchange resins include, but are not limited to: AMBERJET™ 4200(CI); AMBERLITE® IRA-67, IRA-400, IRA-400(CI), IRA-410, IRA-900, IRN-78, IRN-748, IRP-64, IRP-69, XAD-4, XAD-7, and XAD-16; AMBERLYST A-21 and A-26 OH; AMBERSORB® 348F, 563, 572 and 575; DOWEX® 1X2-60 100, 1X2-200, 1X2-400, 1X4-50, 1X4-100, 1X4-200, 1X4-400, 1X8-50, 1X8-100, 1X8-200, 1X8-400, 21K CI, 2X8-100, 2X8-200, 2X8-400, 22 CI, MARATHON® A, MARATHON® A2, MSA-1, MSA-2, 550A, MARATHON® WBA, and MARATHON® WGR-2; and MERRIFIELD'S peptide resins; PUROLITE A200, A500, A845, NRW400, NRW4000, NRW6000 and MICROLITE PrAOH. A specific example of mixed cationic and anionic resins is AMBERLITE® MB-3A; PUROFINE PFA600, PUROLITE MB400, MB600, NRW37, NRW3240, NRW3260 and NRW3460.

Suitable chelating exchange resins for removing heavy metal ions may comprise polyamines on polystyrene, polyacrylic acid and polyethyleneimine backbones, thiourea on polystryrene backbones, guanidine on polystryrene backbones, dithiocarbamate on a polyethyleneimine backbone, hydroxamic acid on a polyacrylate backbone, mercapto on polystyrene backbones, and cyclic polyamines on polyaddition and polycondensation resins.

Other specific examples of chelating ion exchange resins include, but are not limited to: PUROLITE S108, S910, S930Plus and S950; AMBERLITE IRA-743 and IRC-748.

Specific examples of biologically related resins that can be used in the processes and products of the invention include, but are not limited to, SEPHADEX® CM C-25, CM C-50, DEAE A-25, DEAEA-50, QAEA-25, QAEA-50, SP C-25, and SP C-50.

The foregoing cationic, anionic, mixed cationic and anionic, and biologically related ion exchange resins are commercially available from, for example, SIGMA-ALDRICH CHEMICAL CO., Milwaukee, Wis., or from ROHM AND HAAS, Riverside, N.J., or from PUROLITE, Bala Cynwyd, Pa.

Additional examples of ion exchange resins include, but are not limited to AG50W-X12, BIO-REX® 70, and CHELEX® 100, all of which are trade names of BIORAD, Hercules, Calif.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

Example 1

A weak acid cation ion exchange resin, Purolite C107E H+, was used as a baseline material in the experimental examples. The material was acquired in bead form from the manufacturer. Also, the same resin material was pulverized to a fine mesh by Graver Technologies, a company that claims to have a specialized technology for pulverizing resins. The powder had a median particle size of 125 micron. Graver refers to resins ground by their process as "Powdex".

The powdered ion exchange material was dried at about 100° F. in a convection oven. The following materials were blended in a bucket using a drill press with a paddle paint mixer attached. (Activated carbon was added because the specific application being evaluated required some chorine reduction. Activated carbon is optional if chlorine reduction is not required).

| Material | Wt % |
| --- | --- |
| Powder C107E | 63 |
| Ticona GUR 2126 UHMW PR powder | 22 |
| Kuraray PGWH-100MD Activated carbon | 15 |

After two minutes mixing, the blend was filled into molds 2.8" OD×¾" ID×18". Molds were made of aluminum, having a pipe as the outer wall, a solid core pin to define the ID and caps on both ends to contain the media blend. Molds were filled by applying impulses (vertical displacements of the fill table) every 3 seconds. Impulsing was continued for 2 minutes.

Molds were capped tightly to exclude air and to contain the media during heat curing. The mold was placed in a convection oven at 145° C. for 180 minutes. After the molds were heated, the blend was compressed by an air piston with a force of 240 lbf. A comparative mold (COMPARATIVE EXAMPLE 2) was tested without compression.

Molds were then allowed to cool to room temperature. Composite blocks were removed from the molds. Blocks were cut to 6" inch lengths and end caps were glued to the blocks. The blocks molded with compression showed good physical integrity.

Blocks were installed in a cartridge and water was flowed radially through the block from the outside diameter to inside diameter. Flow was continued for one hour. Blocks were removed from the filter and inspected. Although some swelling of the blocks was observed, there was no indication of any mechanical failure due to swelling. Cartridge size can be designed to account for possible swelling of diameter.

Example 2

Comparative

A block made in accordance with Example 1 with the exception that the compress step was omitted. This block showed poor strength and fell apart during handling.

Example 3

Blocks were made as in EXAMPLE 1, with the exception that they were heated at 155° C. for 150 min. Blocks of 2.8" ID were cut to a length of 13" and end capped. Blocks were compared to a packed bed of ion exchange beads in terms of pressure drop and hardness reduction performance.

Example 4

Comparative

For comparison, un-ground beads of Purolite C107E H+ (median particle diameter: 595 micron) were tested in a Cuno SGP-124 cartridge in axial flow mode. The SGP-124 cartridge holds the same volume of resin as the volume of the 2.8"×13" block (0.04 ft$^3$) used in EXAMPLE 3.

Example 5

Testing

FIG. 1 compares pressure drop of the immobilized ground resin in block form of EXAMPLE 3 to loose resin according to COMPARATIVE EXAMPLE 4. As shown, the pressure drop was substantially lower with the composite block.

Hardness reduction performance was measured for the same composite block according to EXAMPLE 3 that was tested for pressure drop as compared to loose beads according to COMPARATIVE EXAMPLE 4. Hardness of influent water was controlled at 320 ppm by addition of calcium and magnesium salts. Water flow rate was controlled at 0.5 gpm.

Figure 2:
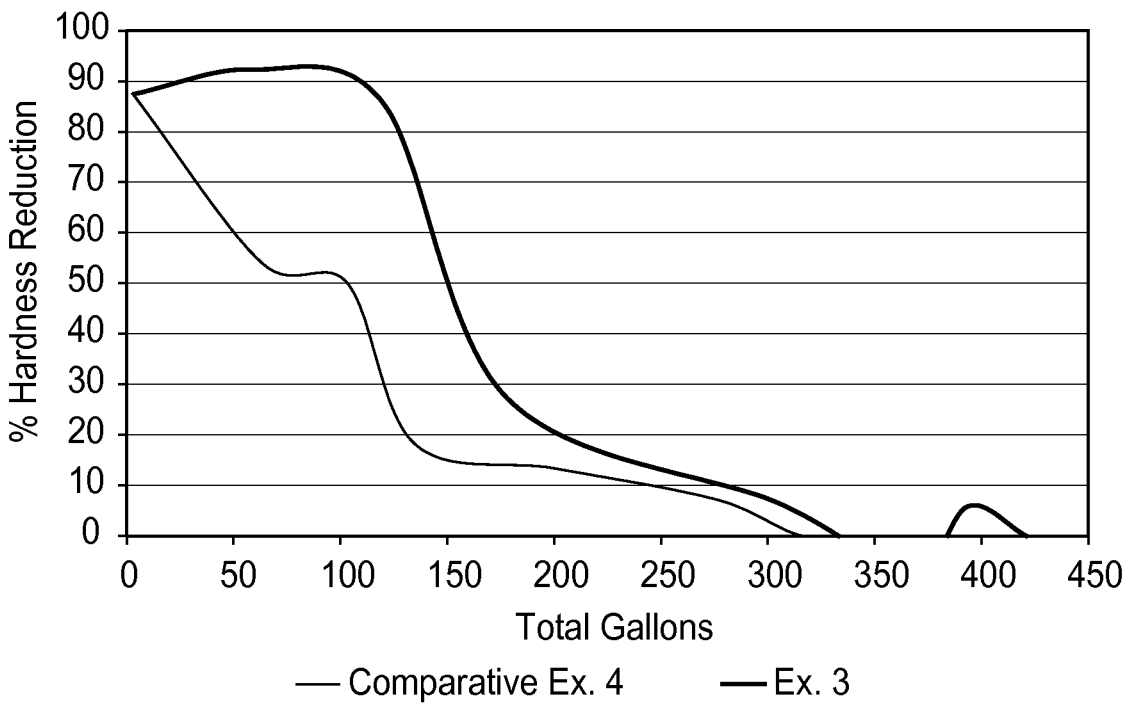
FIG. 2 is a graph of hardness reduction (%) versus total gallons for a comparative packed bed of ion exchange beads and a filtration block made according to an embodiment.

FIG. 2 shows % hardness reduction vs. gallons throughput. The block showed substantially higher hardness reduction over the life of the test, indicating more rapid kinetics of cation exchange. The hardness reduction test was continued to equilibrium, that is, where the effluent hardness level equaled the influent hardness. The hardness reduction vs. time curve was integrated to determine equilibrium capacity of the ion exchange media. The table below compares capacity in terms of grains hardness removed for equivalent volume filters.

| Filter Media/Matrix | Grain |
|---|---|
| COMPARATIVE EXAMPLE 4 Loose Bed of Resin | 1200 |
| EXAMPLE 3 Block | 2000 |

As shown the capacity of the composite media block was greater than the capacity of the fixed bed of loose media, even though the composite contained 22% inactive binder in the blend.

After hardness reduction testing, the composite block was inspected. The block OD did swell giving about a 15% in volume. However, there was no loss in integrity because of the swelling.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A block comprising a filtration matrix comprising a polymeric binder that immobilizes a pulverized powder of an ion exchange resin; the polymeric binder and the pulverized powder of the ion exchange resin having point-to-point bonds in the block formed by a mold compression step of the filtration matrix; the polymeric binder present in an amount in the range of 10% to 40% by weight and the pulverized powder of the ion exchange resin present in an amount of 50% to 90% by weight; the pulverized powder of the ion exchange resin having an average particle size in the range of about 50 to about 250 micron; wherein the ion exchange resin comprises a cation exchange resin, an anion exchange resin, a chelating exchange resin, a biologically-related ion exchange resin, or combinations thereof; and wherein water passes radially through the block.

2. The block of claim 1, further comprising activated carbon that is immobilized by the polymeric binder.

3. The block of claim 2, wherein the activated carbon is present in an amount of 15% by weight of the media.

4. The block of claim 1, wherein the polymeric binder comprises ultra high molecular weight polyethylene.

5. The block of claim 4, wherein the polymeric binder comprises particles having an irregular, convoluted surface formed from ultra high molecular weight polyethylene.

6. The block of claim 1, wherein the pulverized powder of the ion exchange resin has an average particle size of 100 to 150 microns.

7. The block of claim 1, wherein the filtration matrix is effective to provide an increased hardness reduction as compared to a comparative bed media that comprises an ion exchange resin in bead form that is not immobilized by a binder.

8. The block of claim 1, wherein the filtration matrix is effective to provide lower pressure drop as compared to a comparative bed media that comprises an ion exchange resin in bead form that is not immobilized by a binder.

9. The block of claim 1, wherein the pulverized powder of the ion exchange resin has an average particle size of about 125 microns.

10. The block of claim 1, wherein the pulverized powder of the ion exchange resin comprises 63 weight percent, the polymeric binder comprises 22 weight percent and the filtration matrix comprises 15 weight percent of an activated carbon.

11. The block of claim 1, wherein the pulverized powder of the ion exchange resin has an average particle size in the range of 100 to 150 micron and wherein the polymeric binder has an average particle size in the range of 20 to 80 microns.

* * * * *